Dec. 23, 1969  P. L. JOHNSTONE  3,484,916
METHOD OF MAKING NON-WOVEN FABRIC FROM PLIES OF PLASTIC
Filed March 1, 1967
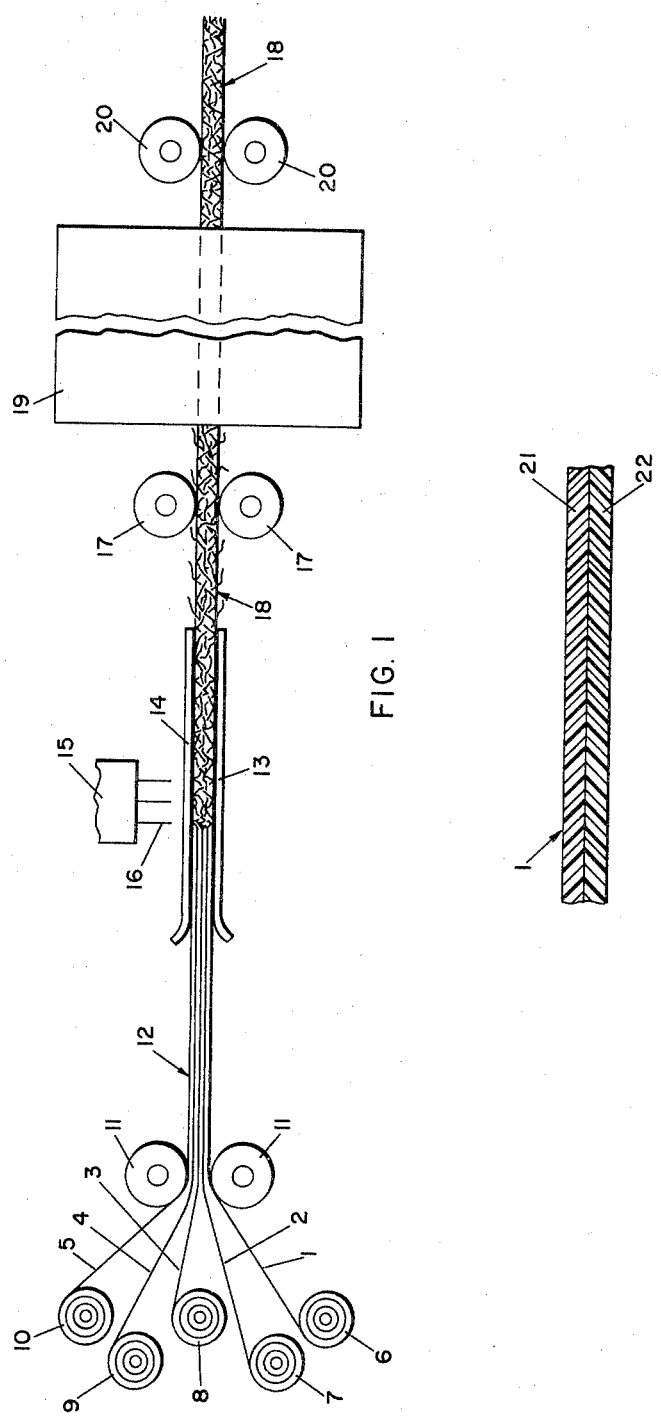
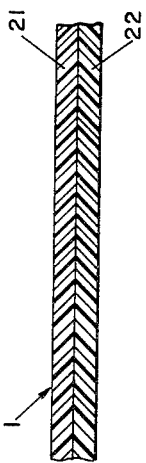
FIG. 1
FIG. 2
PAUL L. JOHNSTONE
INVENTOR.
BY *William L. Peverill*
ATTORNEY United States Patent Office 3,484,916
Patented Dec. 23, 1969

3,484,916
METHOD OF MAKING NON-WOVEN FABRIC FROM PLIES OF PLASTIC
Paul L. Johnstone, Greenville, Del., assignor to Hercules Incorporated, Wilmington, Del., a corporation of Delaware
Filed Mar. 1, 1967, Ser. No. 619,739
Int. Cl. D04h 13/00, 5/02, 5/08
U.S. Cl. 28—72.2    3 Claims

ABSTRACT OF THE DISCLOSURE

This invention relates to a non-woven fabric and a method of making the same wherein a plurality of layers of a uniaxially oriented plastic film are needled by a group of barbed needles to split the film into filaments, with some of the filaments being broken and the ends thereof worked into the fabric, the present invention being characterized by the use of a composite two-ply film which, after needling, is subjected to heat whereby the free ends of the broken filaments will curl because of the uneven shrink characteristics of the two plies and thus cannot readily be pulled from the fabric.

---

The present invention relates to a non-woven fabric and a method of making the same, and particularly to a non-woven fabric and method of the type forming the subject matter of my prior United States patent application Ser. No. 424,646, filed Jan. 11, 1965 and now Patent No. 3,428,506.

The non-woven fabric disclosed and claimed in my prior application Ser. No. 424,646 is formed from a film assembly comprising a plurality of superposed plies of plastic film which is passed through a needling or felting machine in which barbed needles are passed through the film assembly. Each ply of film is stretched or oriented in one direction and is preferably arranged with the axis of orientation thereof at right angles to the axes of orientation of adjacent plies of film. While oriented film has great strength in the direction of the axis of orientation, it is quite weak in the direction transverse to the direction of the axis of orientation. Therefore, when the needles penetrate the film, they tend to split the film a short distance in each direction from the needle hole along lines parallel to the direction of the axis of orientation. Each film ply is thus reduced to a filigree-like structure consisting of parallel filaments aligned in the direction of the axis of orientation and connected together at the unsplit portions of the film between alternate penetrations by the needles. In addition to puncturing the film and splitting it outwardly from the needle hole, the barbs of the needles also break some of the filaments to provide ends that are then pushed into the fabric and become intermeshed with other filaments and ends to provide a non-woven fabric.

The objects of this invention are to provide a non-woven fabric of the type forming the subject matter of my above noted prior application Ser. No. 424,646, and having improved strength both laterally and between the film plies, which strength is obtained through means that are economical and adapted for commercial operation.

According to the present invention, a film assembly is first formed by superposing a plurality of plies of plastic film, as described in my prior copending application Ser. No. 424,646, except that one or more of said plies comprises a composite film consisting of discrete but intimately adhered layers of two plastic materials having different shrink characteristics. The film assembly is then needled, as described in my prior application, and either simultaneously therewith or subsequent thereto is heated at a temperature that will effect substantial shrinkage of one component of said composite ply or plies and minimal shrinkage of the other component of said ply or plies whereby the filaments of said composite ply will undergo crimping. This tends to lock them more firmly with the filaments with which they are intermeshed and results in a substantial increase in tensile strength of the non-woven fabric.

Having in mind the above, as well as other objects that will be evident from an understanding of the invention, a preferred embodiment of the present invention is hereinafter disclosed with reference to the accompanying drawings, in which:

FIG. 1 is aschematic view illustrating an apparatus for performing the process and for making the product of this invention.

FIG. 2 is a fragmentary view in section of one of the plies of plastic film that is to be used in accordance with this invention.

With reference to the drawings, there is illustrated in FIG. 1 an apparatus for performing the process and for producing a non-woven fabric in accordance with this invention. While the number of plies of film may, of course, vary, there are in the illustrated embodiment of the invention five plies of identical film identified at 1, 2, 3, 4 and 5, which are supplied from rolls 6, 7, 8, 9 and 10, respectively. The individual plies of film are collected by a pair of opposed feed rollers 11, one of which is driven, into a superposed relation to provide what is herein termed the film assembly 12.

From the feed rollers 11, the film assembly 12 passes between the bed plate 13 and the stripper plate 14 of a needling or felting machine that also includes a needle bar 15 carrying a plurality of barbed needles 16 that, in the usual manner, may be arranged in rows along the length of the needle bar 15. The needle bar 15 is adapted to be reciprocated by conventional means (not shown) to project the needles 16 through the film assembly 12 and through aligned holes in the stripper plate 14 and bed plate 13. At the output side of the needling machine, there is provided a pair of puller feed rollers 17 which act to advance through the machine the film assembly 12 and the non-wove nor needled fabric 18 produced therefrom.

In the illustrated embodiment of the invention, the needled fabric 18 is subjected to a heat treatment which may be effected, for example, in an oven 19. To advance the fabric 18 through the oven 19 there is provided a pair of opposed puller feed rollers 20, one of which is driven. The rollers 20 preferably impose a tension on the fabric 18 between them and the rollers 17, not only to support the fabric 18 by tension within the oven 19, but also to cortrol the endwise shrinkage of the fabric.

The films 1, 2, 3, 4 and 5 are each uniaxially oriented and therefore, because of the inherent weakness of such film in the direction transverse to the axis of orientation, splits in both directions from the needle hole along the axis of orientation as the needle penetrates the film. After successive penetrations by the needle and advancement of the film assembly 12 between each penetration, each film is reduced to a filigree-like structure consisting of a plurality of filaments extending parallel to the axis of orientation and connected to the adjacent filament at the unsplit portions between successive needle penetrations. The length of the splits that are developed by the needle hole can be varied by varying the tension imposed upon the film between the feed rollers 11 and 17.

As the films are split by the needles into a filamentary structure, the filaments are caught in a random fashion by the barbs of the needle and broken to produce ends that are pushed through the adjacent plies of film. In this manner, the ends are thoroughly intermeshed with the filaments and ends of the other plies of the film to form a stable non-woven fabric. While, for convenience, the above described apparatus includes only a single needle bar 15 that is disposed above the film assembly 12, it will be apparent that a second needle bar disposed beneath the film assembly 12 and operating upwardly therethrough may also be used.

The direction in which the axis of orientation of the various plies of film in the film assembly 12 are arranged may be varied to produce different effects in the fabric, that is, particularly to increase or to decrease the tensile strength of the fabric in any one direction by aligning the axis or orientation of more or less of the films in the selected direction. In a preferred arrangement the axis of orientation of each ply is disposed substantially at right angles to the axes of orientation of adjacent plies.

In accordance with this invention, the film assembly that is used includes one or more plies of a composite film having intimately adhered discrete layers of two different plastic materials, as illustrated at 21 and 22 in FIG. 2. While the specific composite film or the method of manufacturing the same forms no part of this invention, such film may be formed, for example, by bringing the two materials or components together in a molten condition at the die of a film extruder in such a manner that they will be layered and not mixed and simultaneously extruded in a single sheet, which sheet is then expanded and uniaxially oriented in the usual manner. For purposes of this invention, it is required only that the two materials or components of the composite film have significantly different shrink properties at some heat treating temperature. An example of a suitable film is an integrally formed uniaxially stretched film having discrete layers of polypropylene of different molecular weigh distribution but of similar melt flow, which is heat treated in the oven 19 at a temperature of about 140° C. As such a temperature, except insofar as it might be restrained for example, between the rollers 17 and 20, one layer shrinks substantially more than the other. Accordingly, there is an uneven shrinkage between the two layers of the filament and the same will therefore be crimped as it is heated in the oven 19.

The manner in which the heat is applied to the fabric can also be varied. While the heat treatment in the illustrated embodiment of the invention is effected in the oven 19, it may also be effected at the time the fabric is needled, as for example, by applying the heat to the fabric through heating the bed plate 13 and stripper plate 14.

The amount of heat that is applied to the fabric is controlled to produce different effects. From the standpoint of improved strength, the individual ends, as well as the filaments themselves, if permitted to assume a crimp, become more firmly interlocked with the ends and filaments with which they are intermeshed. Crimping of the filaments also effects a shrinkage of the fabric which can, to a certain extent, be controlled by placing the fabric under tension as by a longitudinal tension imposed by the rollers 17 and 20 and by a transverse tension imposed by a tender mechanism (not shown). Accordingly, it will generally be desirable to effect only a limited amount of crimping, or else to tension the fabric to control shrinkage during heating. By exposing only the surface of the fabric to heat, only the filament ends that protrude from or lie on the surface become crimped, which in effect knots these ends and increases their resistance to being pulled back through the fabric. By tensioning the fabric to control shrinkage and by exposing the fabric to heat sufficient to penetrate the same, a thorough crimping of all of the untensioned ends and filaments is effected. By exposing the untensioned fabric to a thorough heating, complete crimping as well as significant shrinkage results.

The materials from which composite films are formed are selected on the basis of their compatibility in the film-forming operation, as well as the difference in their shrinking characteristics. In the film-forming operation, if the above-mentioned extrusion process is employed, the polymers must be capable of being simultaneously extruded into a single composite sheet of two distinct integrally-formed layers of materials having different shrink characteristics, and subsequently uniaxially oriented. In the crimping operation, the shrink temperatures of the two polymers must be sufficiently different that the differential shrinkage may be performed on a commercial basis. The materials used may, for example, be two polypropylene polymers of different molecular weights and/or molecular weight distributions. More generally, the materials may be polyolefins such as polyethylene, polypropylene, and poly(butene-1); the polyesters such as poly(ethylene terephthalate) and poly(1,4-cyclohexylenedimethylene terephthalate); the polyamides such as nylon 6/6, nylon 6/10 and nylon 6; polystyrene, copolymers of vinylidene chloride and vinyl chloride; poly(vinylidene chloride); poly(vinyl chloride), the polyethers such as poly(ethylene oxide) and poly(propylene oxide), and the like.

What I claim and desire to protect by Letters Patent is:

1. In the method of producing a non-woven fabric from a film assembly consisting of a plurality of superposed plies of uniaxially oriented plastic film by repeatedly projecting a plurality of barbed needles endwise through said film assembly and advancing said film assembly between alternate penetrations by said needles for splitting said film in the direction parallel to the axis of orientation to form filaments and for breaking at least some of said filaments and forcing the ends thereof into intermeshing relation with other filaments and ends, the improvement comprising employing in said process as at least one ply of said assembly a composite film having discrete and intimately-adhered layers of two plastic materials having different shrink characteristics when heated, and heating said needled fabric at a temperature that will effect substantial shrinkage of one material and minimal shrinkage of the other material, whereby there is imparted to said filaments a crimp that increases the resistance of said filament to being pulled out of such fabric.

2. In the method of claim 1 wherein said heating of said fabric is confined to the surface thereof whereby the ends of said filaments are crimped.

3. In the method of claim 1 wherein said fabric is tensioned during said heating to control the shrinkage thereof.

References Cited

UNITED STATES PATENTS

| | | | |
|---|---|---|---|
| 3,003,304 | 10/1961 | Rasmussen | 161—402 X |
| 3,205,342 | 9/1965 | Smith et al. | 156—148 X |
| 3,253,072 | 5/1966 | Scragg et al. | 264—288 X |
| 3,336,174 | 8/1967 | Dyer et al. | 156—167 |
| 3,388,031 | 6/1968 | Mazzolini | 161—173 |

ROBERT F. BURNETT, Primary Examiner

R. L. MAY, Assistant Examiner

U.S. Cl. X.R.

28—72.17; 161—154, 402; 264—210